United States Patent
Ozcan et al.

(10) Patent No.: US 9,340,461 B1
(45) Date of Patent: May 17, 2016

(54) METHOD OF MAKING CONTROLLED MORPHOLOGY METAL-OXIDES

(71) Applicant: UT-Battelle, LLC, Oak Ridge, TN (US)

(72) Inventors: Soydan Ozcan, Oak Ridge, TN (US); Yuan Lu, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 14/551,460

(22) Filed: Nov. 24, 2014

(51) Int. Cl.
| | |
|---|---|
| H01L 21/02 | (2006.01) |
| H01L 29/06 | (2006.01) |
| H01L 29/26 | (2006.01) |
| C04B 35/622 | (2006.01) |
| C04B 35/64 | (2006.01) |

(52) U.S. Cl.
CPC ........... *C04B 35/62218* (2013.01); *C04B 35/64* (2013.01); *C04B 2235/3232* (2013.01); *C04B 2235/3272* (2013.01); *C04B 2235/3284* (2013.01); *C04B 2235/3293* (2013.01); *C04B 2235/5212* (2013.01)

(58) Field of Classification Search
CPC .......... H01L 21/02; H01L 29/06; H01L 29/26
See application file for complete search history.

(56) References Cited

U.S. PATENT DOCUMENTS

| | | | |
|---|---|---|---|
| 8,003,881 B2 | 8/2011 | Berson et al. | |
| 8,771,632 B2 | 7/2014 | Kim et al. | |
| 2007/0199480 A1 | 8/2007 | Zhou et al. | |
| 2008/0143906 A1* | 6/2008 | Allemand et al. | 349/43 |
| 2010/0092809 A1 | 4/2010 | Drzal et al. | |
| 2010/0258759 A1 | 10/2010 | Archer et al. | |
| 2010/0278720 A1 | 11/2010 | Wong et al. | |
| 2011/0036269 A1 | 2/2011 | Hill et al. | |
| 2011/0248214 A1 | 10/2011 | Maclachlan et al. | |
| 2013/0089492 A1 | 4/2013 | MacLachlan et al. | |
| 2013/0168228 A1 | 7/2013 | Ozin et al. | |
| 2014/0109967 A1 | 4/2014 | Min et al. | |
| 2014/0273147 A1 | 9/2014 | Joshi et al. | |
| 2015/0076494 A1* | 3/2015 | Pickett et al. | 257/43 |

FOREIGN PATENT DOCUMENTS

| | | |
|---|---|---|
| JP | 2009501095 | 1/2009 |
| WO | 2009125018 | 10/2009 |
| WO | 2014119868 | 8/2014 |

OTHER PUBLICATIONS

Zihui Li, et al., "Metal Nanoparticle—Block Copolymer Composite Assembly and Disassembly," Chem Mater, 2009, pp. 5578-5584, vol. 21.
International Bureau, "Written Opinion," 2016.

* cited by examiner

*Primary Examiner* — Marc Armand
(74) *Attorney, Agent, or Firm* — Joseph A. Marasco (57) ABSTRACT

A method of making metal oxides having a preselected morphology includes preparing a suspension that includes a solvent, polymeric nanostructures having multiplicities of hydroxyl surface groups and/or carboxyl surface groups, and a metal oxide precursor. The suspension has a preselected ratio of the polymeric nanostructures to the metal oxide precursor of at least 1:3, the preselected ratio corresponding to a preselected morphology. Subsequent steps include depositing the suspension onto a substrate, removing the solvent to form a film, removing the film from the substrate, and annealing the film to volatilize the polymeric nanostructures and convert the metal oxide precursor to metal oxide nanoparticles having the preselected morphology or to a metal oxide nanosheet including conjoined nanoparticles having the preselected morphology.

13 Claims, 7 Drawing Sheets

METHOD OF MAKING CONTROLLED MORPHOLOGY METAL-OXIDES

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

BACKGROUND OF THE INVENTION

Metal oxide materials have been widely utilized in various applications including transparent electronics, smart windows, high-density magnetic memory, and coatings. However, low-cost, large scale preparation of metal oxide particles and films has heretofore posed a significant challenge. There is a need for a simple, environmentally friendly, straightforward, industrially scalable process that provides a pathway to make metal oxide particles having at least one well-defined morphology such as, for example, octahedral nanocrystals, nanobelts, nanospheres and nanowires.

BRIEF SUMMARY OF THE INVENTION

In accordance with at least one aspect of the present invention, the foregoing and other objects are achieved by a method of making metal oxides having a preselected morphology includes preparing a suspension that includes a solvent, polymeric nanostructures having multiplicities of hydroxyl surface groups and/or carboxyl surface groups, and a metal oxide precursor. The suspension has a preselected ratio of the polymeric nanostructures to the metal oxide precursor of at least 1:3, the preselected ratio corresponding to a preselected morphology. Subsequent steps include depositing the suspension onto a substrate, removing the solvent to form a film, removing the film from the substrate, and annealing the film to volatilize the polymeric nanostructures and convert the metal oxide precursor to metal oxide nanoparticles having the preselected morphology or to a metal oxide nanosheet including conjoined nanoparticles having the preselected morphology.

For a better understanding of the present invention, together with other and further objects, advantages and capabilities thereof, reference is made to the following disclosure and appended claims in connection with the above-described drawings.

DETAILED DESCRIPTION OF THE INVENTION

Cellulose nanofibrils (CNF), nano-sized cellulose fibers produced by bacteria or derived from plants, are well-known templates for atomic layer deposition (ALD) synthesis of metal oxide materials owing to the ease of template removal by processes such as high temperature degradation, for example. In the present invention, CNF is used as a template, but by means of a materially different chemical mechanism and thus a materially different process.

Cellulose nanofibrils (CNF) also called cellulose nanofibers are composed of nanosized cellulose fibrils with a high aspect ratio (length to width ratio). Commonly used preparation methods are mechanical separation and/or reaction with (2,2,6,6-Tetramethylpiperidin-1-yl)oxy, or (2,2,6,6-tetramethylpiperidin-1-yl) oxidanyl which is also known as TEMPO mediated oxidation. Herein CNF is used as a templating material to form the three dimensional network to control the spatial distribution of conjugated metals.

Moreover, cellulose nanocrystals, or microfibrilated cellulose (submicron and micron size), and/or any natural or synthetic polymeric fiber having a multiplicity of hydroxyl and/or carboxyl surface groups can be used, with expected results concomitant with the templating effects thereof. Combinations of any of the foregoing can also be used, with expected results concomitant with the templating effects of the constituents of the combinations.

It has been discovered that metal oxide nanoparticles can be synthesized by the affinity of cellulose oxygen associated groups such as hydroxyl and/or carboxylic acid groups to metal ions to conjugate metal oxide precursors in an aqueous environment. A three-dimensional network of CNF structures form upon drying. Thus, the method allows for control over the spatial distribution, and thus the morphologies, of metal ions. It is possible to control resulting particle morphologies, such as, for example, nanowires, nanorods, nanospheres, nanocrystals, and the like.

The following general definitions are given for the purposes of describing and defining the products that can be made using the method of the present invention. A nanowire is defined as a particle having an average diameter of 5-200 nm and an aspect ratio of at least 10. A nanorod is defined as a particle having an average diameter of 5-300 nm and an aspect ratio of less than 10. A nanosphere is defined as a generally globular particle having an average diameter of 50-350 nm. A nanocrystal is defined as a particle having a crystalline appearance and an average diameter of 50-750 nm.

The method of the present invention is applicable to specific metal oxides. Since various groups of metals and individual elements within those groups exhibit various chemical behaviors, there are corresponding variations in the method steps for making the desired product.

General Process Steps for Making Nanoparticles

Step 1: To make nanoparticles prepare an aqueous CNF (or other templating material as described hereinabove) suspension having a CNF concentration in the range of 0.001 to less than 1 weight %, preferably in the range of 0.01 to 0.5 weight %, more preferably in the range of 0.05 to 0.25 weight %.

Step 2: Add metal ions in sufficient concentration to obtain a product having a preselected morphological characteristic, and mix the solution to result in an essentially homogeneous suspension of CNF-conjugated metal ions. A dilute solution will produce nanowires, a moderately concentrated solution will produce nanospheres, and a more concentrated solution will produce nanocrystals.

Step 3: Concentrate the CNF-conjugated metal ions by centrifugation, settling, filtering, or other conventional method. Separate the concentrated CNF-conjugated metal ions from the CNF solution to remove unbound metal ions.

Step 4: Re-disperse the concentrated CNF-conjugated metal ions in water, deposit the aqueous dispersion onto a suitable substrate such as glass, ceramic, polymer, metal, or the like, and remove the water to form a CNF film conjugated with metal ions.

Step 5: Remove the film from the substrate and anneal the film to volatilize the templating material and to synthesize nanoparticles having the preselected morphology. Annealing temperature is dependent on the forming temperature of the oxide being made, and also on the volatility of the precursor(s) employed. It is desirable to convert all of the precursor to the target oxide, but not to volatilize a substantial amount of the precursor material.

General Process Steps for Making Nanosheets

For the purposes of describing the present invention, a nanosheet is defined as a planar body comprising conjoined nanoparticles, the nanoparticles having a preselected morphology, especially at least one of nanowires, nanorods, nanospheres, and nanocrystals.

Step 1: To make nanosheets prepare an aqueous CNF suspension having a CNF concentration in the range at least 1% to 5%.

Step 2: Add metal ions in sufficient concentration to obtain a product having a preselected morphological characteristic, and mix the solution to result in an essentially homogeneous suspension of CNF-conjugated metal ions. A dilute solution will produce nanowires, a moderately concentrated solution will produce nanospheres, and a more concentrated solution will produce nanocrystals. The relatively higher concentration of CNF results in strong conjugation and formation of a cross-linked hydrogel.

Step 3: deposit the hydrogel onto a suitable substrate such as glass, ceramic, polymer, metal, or the like, and remove the water to form a CNF hydrogel film conjugated with metal ions.

Step 4: Remove the film from the substrate and anneal the film to volatilize the templating material and to synthesize nanosheet having the preselected morphology. Annealing temperature is dependent on the forming temperature of the oxide being made, and also on the volatility of the precursor(s) employed. It is desirable to convert all of the precursor to the target oxide, but not to volatilize a substantial amount of the precursor material.

Indium Tin Oxide (ITO)

Exceptionally useful properties of ITO, including high electrical conductivity and high optical transparency for example, have driven this material to become recognized as the industrial standard among transparent conductive oxides. ITO has been used extensively in a wide array of electronic applications including toxic-gas sensors, photovoltaic cells, defogging of aircraft windows, light emitting diodes, biomolecular microarrays, IR blocking coatings, functional glass, and flat panel displays for example. ITO nanoparticles have drawn significant interest because they enable the fabrication of enhanced-performance porous electrodes, electrochemical capacitors, solar cells, and lithium ion batteries, for example. Other advantages include low manufacturing costs and easy processability into films with high flexibility in substrate structure and geometry. The method of the present invention enables control of the morphology and size of ITO nanoparticles, which determine the properties exhibited in ITO products.

CNF is mixed with water at ambient temperature to form a suspension as described hereinabove.

ITO precursors, indium chloride and tin chloride (e.g. tin (II) chloride), for example, are dissolved in water to form a precursor solution having a total concentration of metal ions in the range of 0.04 to 4 weight %. The precursor solution was added drop-wise to CNF suspension; a strong interaction between multivalent indium (In) and tin (Sn) cations and CNF leads to efficient conjugation. Ideally for many applications, the molar ratio of In:Sn is considered to be about 9:1, but the ratio is not critical to the present invention. Due to loss of indium in the annealing step described below, it may be beneficial to increase the initial amount of indium to achieve a product having the desired ratio.

The conjugated CNF-In—Sn is concentrated by centrifugation, the fibers are collected to remove them from unbound metal ions, and then re-dispersed in water to form a flowable, castable aqueous suspension. The suspension of CNF-In—Sn fibers can be cast onto a substrate and dried to form a CNF film conjugated with ITO precursors. By annealing the film at a temperature in a range of 300-1000° C., preferably 500-950° C., more preferably 700-900° C., ITO particles with tunable morphologies (e.g., nanowires, nanospheres, octahedrons) are synthesized. The annealing temperature should be high enough to volatilize the CNF but not so high as to deleteriously affect the ITO particles.

Tunable morphologies and other properties are determined by the initial CNF/ITO precursor ratio (metal ion distribution) used in the synthesis process. When a CNF/ITO precursor ratio in the range of 1:3 to 1:7 is used, ITO nanowires are produced. When a CNF/ITO precursor ratio in the range of 1:17 to 1:23 is used, ITO nanowires are produced. When a CNF/ITO precursor ratio in the range of 1:27 to 1:33 is used, ITO nanospheres are produced. When a CNF/ITO precursor of 1:70 or greater is used, ITO octahedrons are produced. Ratios between the given ranges are expected to produce a mixture of the respective shapes. Such mixtures of shapes may be useful for some applications.

EXAMPLE I

Figure 1:
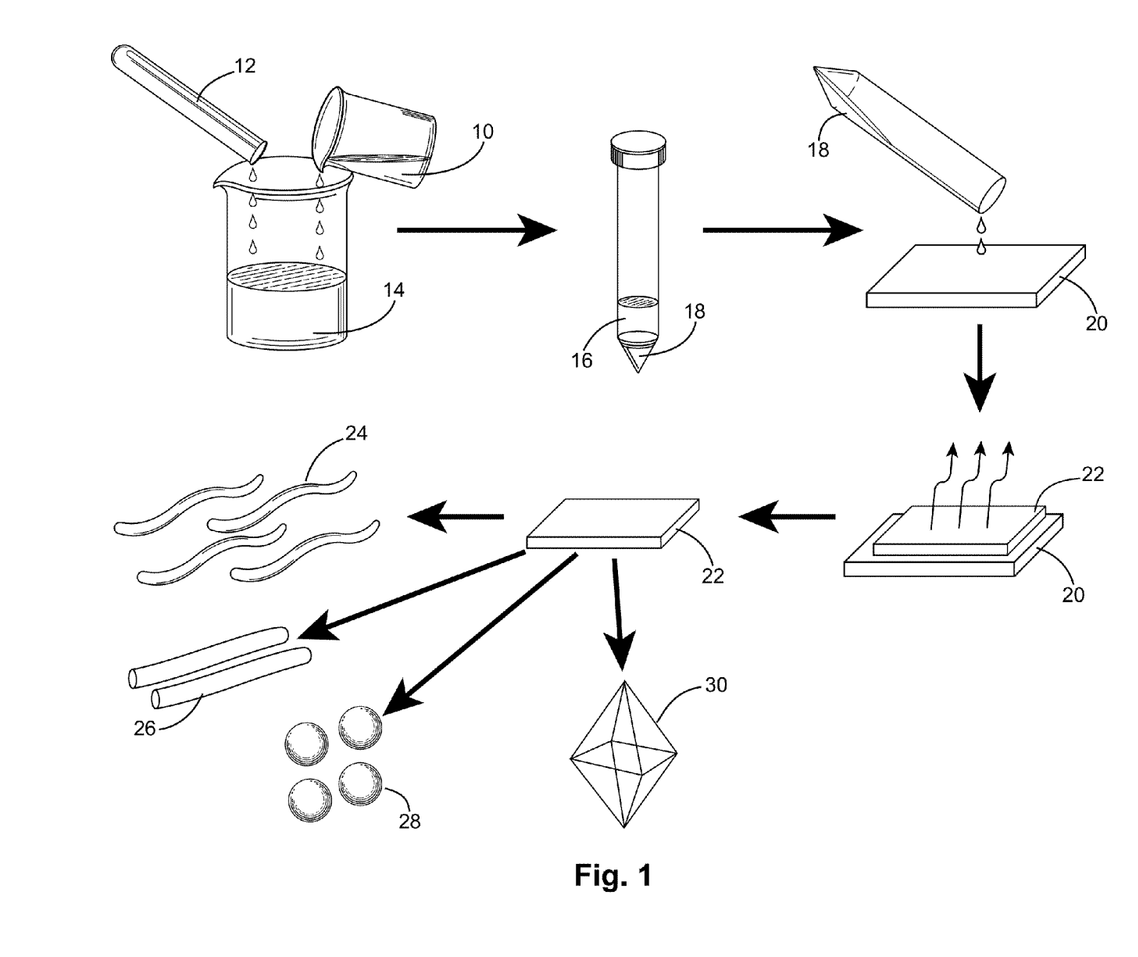
FIG. 1 is a schematic illustration of the synthesis of indium tin oxide (ITO) nanoparticles using cellulose nanofibril (CNF) templates.
Figure 2:
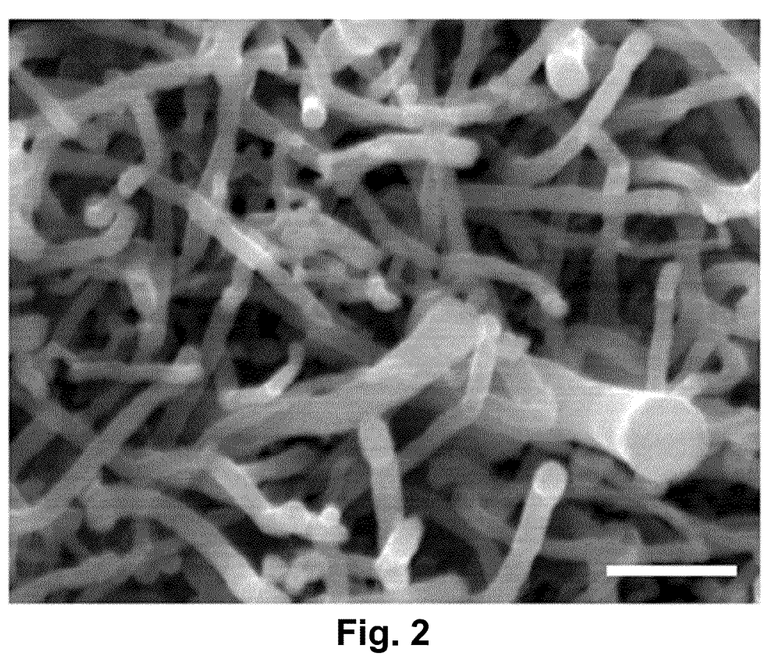
FIG. 2 is a scanning electron microscope (SEM) image of ITO nanowires. Scale bar=300 nm.
Figure 3:
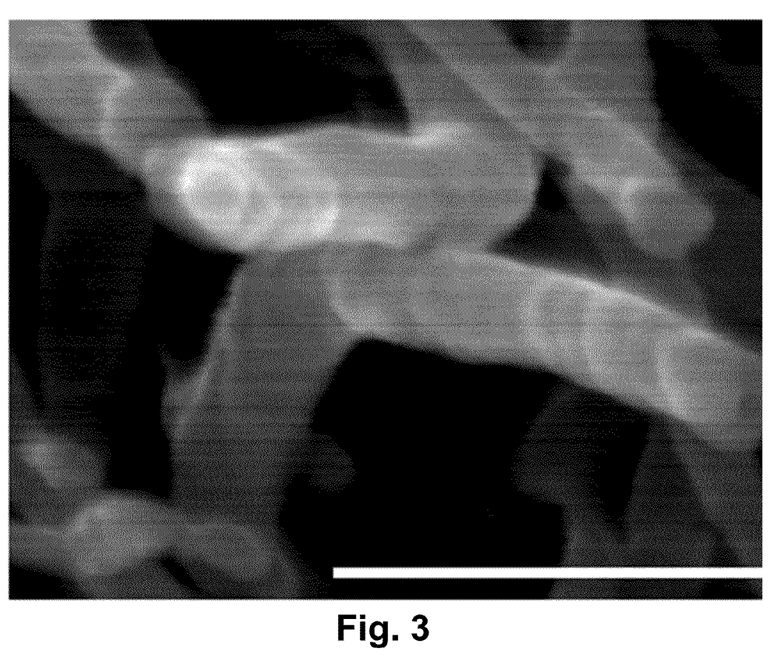
FIG. 3 is a highly magnified SEM image of ITO nanowires. Scale bar=300 nm.

Referring to FIG. 1, a 0.1 weight % suspension of CNF 10 was prepared. Indium chloride and tin chloride were dissolved in water to form an ITO precursor solution 12 having an In:Sn molar ratio of 9:1. ITO precursor solution was added to of the CNF suspension to form an ITO precursor/CNF suspension 14 having a CNF:ITO precursor ratio of 1:5. The ITO precursor/CNF suspension 14 was centrifuged and the supernatant 16 was removed. The precipitate 18 was re-dispersed in water and cast onto a glass substrate 20. The water was volatilized, indicated by arrows, to form an ITO precursor/CNF film 22. The film 22 was removed from the substrate and heated (annealed) to a temperature of 900° C. to volatilize the CNF and convert the precursor to ITO. Resultant ITO nanoparticles had the shape of nanowires 24. Properties of the ITO nanowires 24 are given in Table 1, which includes In:Sn ratio on the surface of the ITO nanowires 24 as analyzed by X-ray photoelectron spectroscopy (XPS). SEM images of the ITO nanowires 24 are shown in FIGS. 2, 3.

EXAMPLE II

Figure 4:
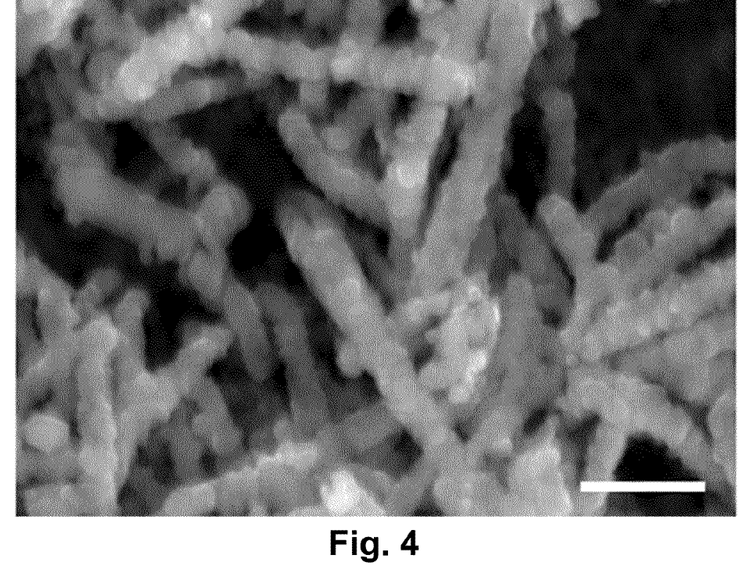
FIG. 4 is an SEM image of ITO nanorods. Scale bar=300 nm.
Figure 5:
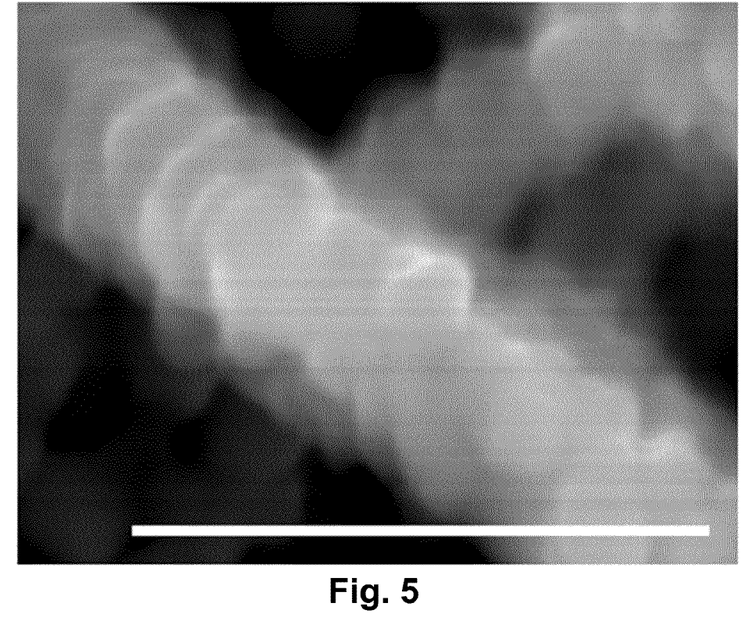
FIG. 5 is a highly magnified SEM image of ITO nanorods. Scale bar=300 nm.

ITO nanoparticles were formed as described in Example I with the exception that a CNF/ITO precursor ratio of 1:20 was used. Resultant ITO nanoparticles had the shape of nanorods 26, having greater surface roughness and particle diameter compared to that of Example I. Properties of the ITO nanorods 26 are given in Table 1, which includes In:Sn ratio on the surface of the ITO nanorods 26 as analyzed by X-ray photoelectron spectroscopy (XPS). SEM images of the ITO nanorods 26 are shown in FIGS. 4, 5.

EXAMPLE III

Figure 6:
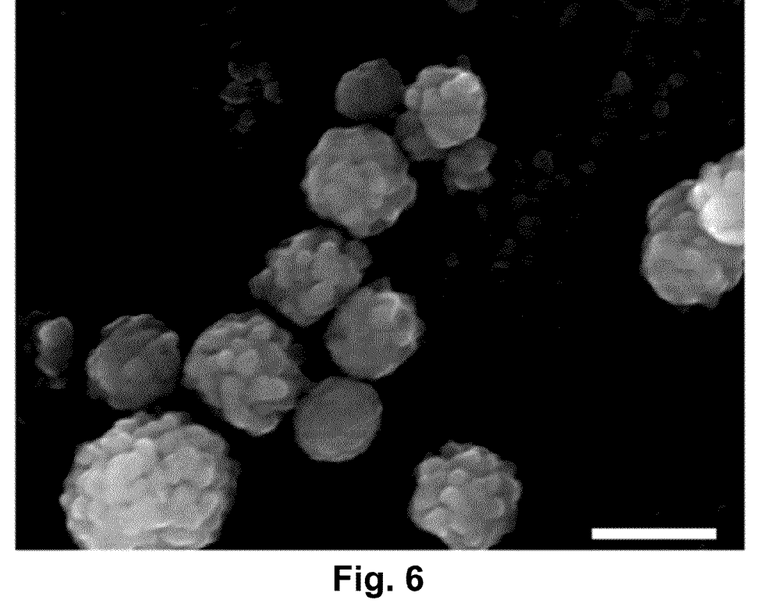
FIG. 6 is an SEM image of ITO nanospheres. Scale bar=300 nm.
Figure 7:
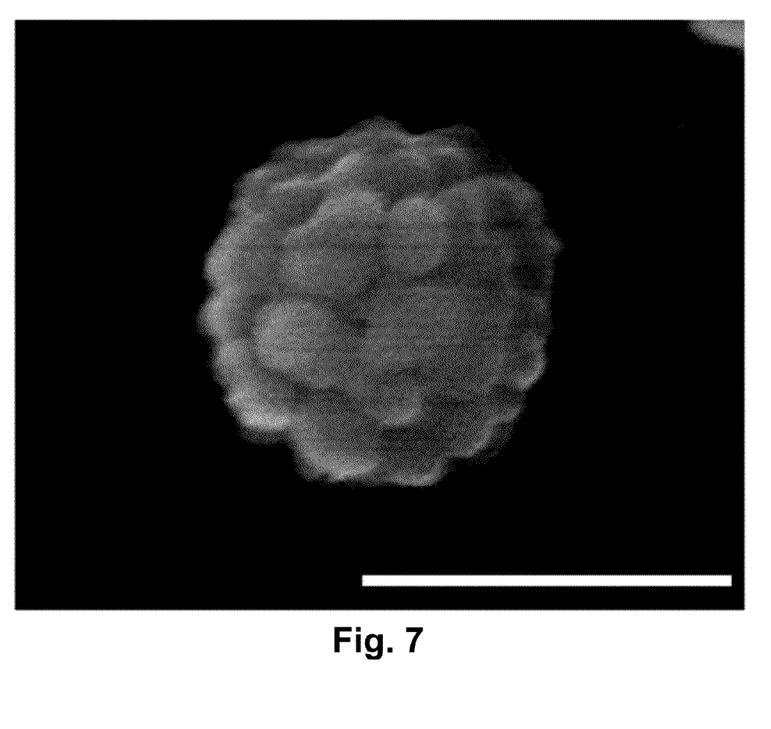
FIG. 7 is a highly magnified SEM image of ITO nanospheres. Scale bar=300 nm.

ITO nanoparticles were formed as described in Example I with the exception that a CNF/ITO precursor ratio of 1:30 was used. Resultant ITO nanoparticles had the shape of nanospheres 28 having significant surface roughness. Properties of the ITO nanospheres 28 are given in Table 1, which includes In:Sn ratio on the surface of the ITO nanospheres 28 as analyzed by X-ray photoelectron spectroscopy (XPS). SEM images of the ITO nanospheres 28 are shown in FIGS. 6, 7.

EXAMPLE IV

Figure 8:
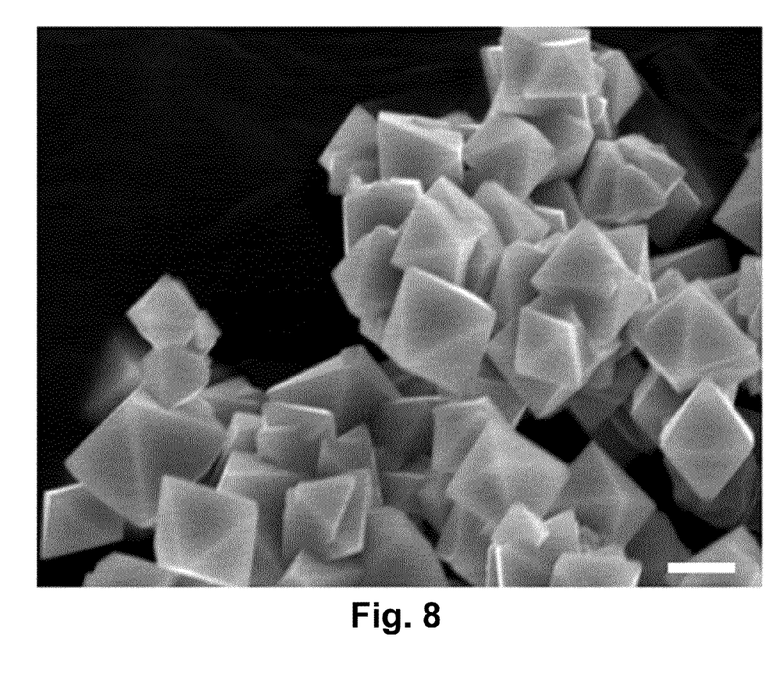
FIG. 8 is an SEM image of ITO nanocrystals. Scale bar=300 nm.
Figure 9:
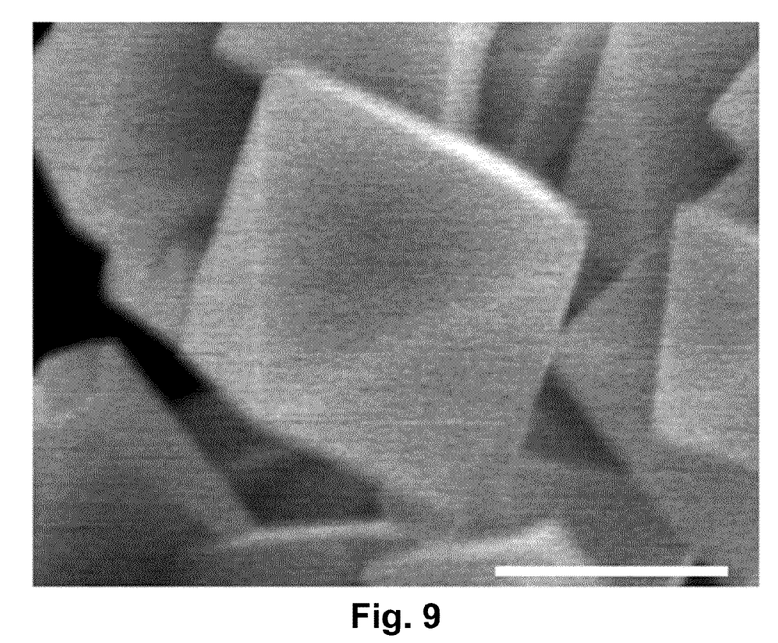
FIG. 9 is a highly magnified SEM image of ITO nanocrystals. Scale bar=300 nm.
Figure 10:
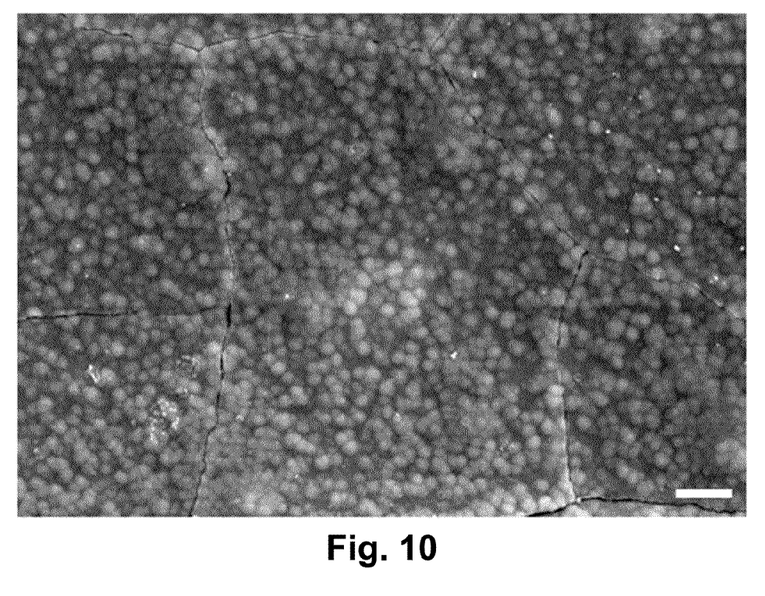
FIG. 10 is an SEM image of a film surface comprising ITO nanospheres. Scale bar=2 µm.
Figure 11:
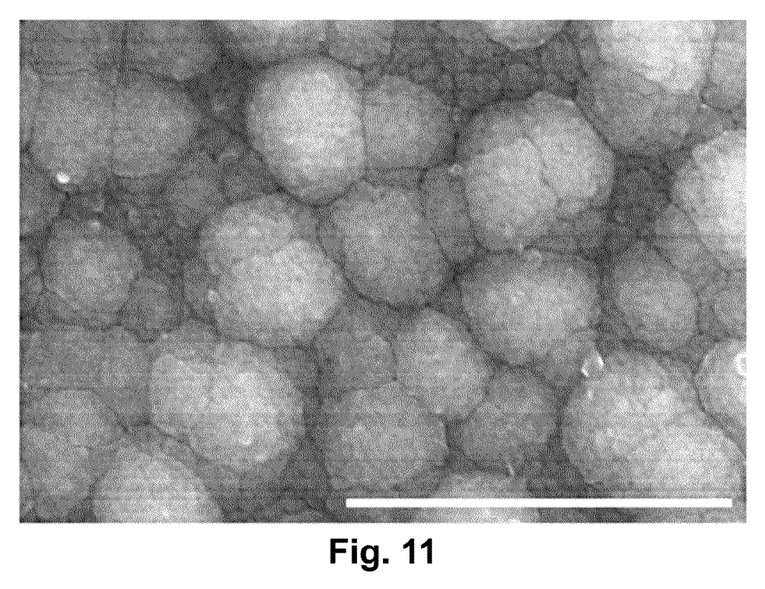
FIG. 11 is a highly magnified SEM image of a film surface comprising ITO nanospheres. Scale bar=2 µm.
Figure 12:
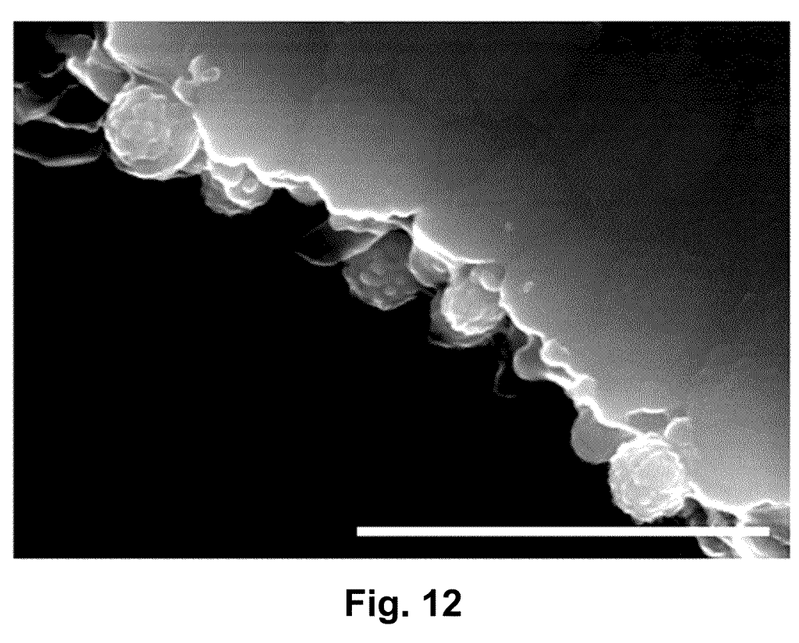
FIG. 12 is a highly magnified SEM image of a film edge comprising ITO nanospheres. Scale bar=2 µm.

ITO nanoparticles were formed as described in Example I with the exception that a CNF/ITO precursor ratio of 1:80 was used. Resultant ITO nanoparticles were in the form of nanocrystals 30 having an octahedral structure. Properties of the ITO nanocrystals 30 are given in Table 1, which includes In:Sn ratio on the surface of the ITO nanocrystals 30 as analyzed by X-ray photoelectron spectroscopy (XPS). SEM images of the ITO nanocrystals 30 are shown in FIGS. 8, 9. Unlike the other particles, these octahedral nanocrystals 30 have smooth surfaces. X-ray diffraction patterns of the nanocrystals 30 match well with the cubic bixbyite peaks of commercial ITO nanoparticles, which are slightly shifted to higher $2\theta$ values compared to those of pure cubic indium oxide. The atomic percentage of indium for the as-synthesized ITO nanocrystals 30 is slightly lower than that for commercially available ITO particles obtained from SkySpring Nanomaterials, Inc., Houston, Tex.

TABLE 1

| | CNF:ITO Precursor | Morphology | Diameter (nm) | Surface In:Sn |
|---|---|---|---|---|
| EXAMPLE I | 1:5 | Nanowire | 73 ± 5 | 80:20 |
| EXAMPLE II | 1:20 | Nanorods | 107 ± 10 | 83:17 |
| EXAMPLE III | 1:30 | Nanospheres | 268 ± 35 | 79:21 |
| EXAMPLE IV | 1:80 | Octahedrons | 650 ± 65 | 82:17 |
| Commercially Available ITO | — | — | — | 83:17 |

Well-defined morphology of ITO nanoparticles provides unique advantages in specific applications such as, for example, nanowire/nanorod sensors, which have attracted much attention because their large surface area to volume ratio promises high sensitivity.

Other Metal Oxide Systems

The process described hereinabove can be used to make controlled-morphology nanoparticles of various other metal oxide systems. Examples include, but are not limited to zinc oxide, titanium oxide, and iron oxide, and other transition metal oxides.

EXAMPLE V

Zinc chloride is dissolved in water to form an ZnO precursor solution and added to CNF suspension to form an ZnO precursor/CNF suspension having a CNF:ZnO precursor ratio of 1:5. The resulting precipitate is processed as described in Example I to form ZnO nanowires.

EXAMPLE VI

Titanium chloride is dissolved in water to form an $TiO_2$ precursor solution and added to CNF suspension to form an $TiO_2$ precursor/CNF suspension having a CNF:$TiO_2$ precursor ratio of 1:5. The resulting precipitate is processed as described in Example I to form $TiO_2$ nanowires.

EXAMPLE VII

Ferric chloride is dissolved in water to form an $Fe_2O_3$ precursor solution and added to CNF suspension to form an $Fe_2O_3$ precursor/CNF suspension having a CNF:$Fe_2O_3$ precursor ratio of 1:5. The resulting precipitate is processed as described in Example I to form $Fe_2O_3$ nanowires.

EXAMPLE VIII

ITO nanoparticles are formed as described in Example I with the exception that a CNF concentration of 1% is used so that a cross-linked CNF/ITO precursor hydrogel sheet is formed. The hydrogel sheet is annealed at 900° C. to form a nanosheet comprising conjoined nanowires.

EXAMPLE IX

ITO nanoparticles are formed as described in Example I with the exception that a CNF concentration of 1% is used so that a cross-linked CNF/ITO precursor hydrogel sheet is formed. The hydrogel sheet is annealed at 900° C. to form a nanosheet comprising conjoined nanorods.

EXAMPLE X

ITO nanoparticles are formed as described in Example I with the exception that a CNF concentration of 1% is used so that a cross-linked CNF/ITO precursor hydrogel sheet is formed. The hydrogel sheet is annealed at 900° C. to form a nanosheet comprising conjoined nanospheres.

EXAMPLE XI

ITO nanoparticles are formed as described in Example I with the exception that a CNF concentration of 1% is used so that a cross-linked CNF/ITO precursor hydrogel sheet is formed. The hydrogel sheet is annealed at 900° C. to form a nanosheet comprising conjoined nanocrystals.

While there has been shown and described what are at present considered to be examples of the invention, it will be obvious to those skilled in the art that various changes and modifications can be prepared therein without departing from the scope of the inventions defined by the appended claims.

What is claimed is:

1. A method of making metal oxides having a preselected morphology comprising the steps of:
   a. preparing an aqueous suspension comprising water, polymeric nanostructures having multiplicities of surface groups including at least one surface group selected from the group consisting of a hydroxyl surface group and a carboxyl surface group, and a metal oxide precursor, said suspension having a preselected ratio of said polymeric nanostructures to said metal oxide precursor of at least 1:3, said preselected ratio corresponding to a preselected morphology;

b. depositing said suspension onto a substrate;
c. removing said water to form a film;
d. removing said film from said substrate; and
e. annealing said film to volatilize said polymeric nanostructures and convert said metal oxide precursor to at least one metal oxide selected from the group consisting of metal oxide nanoparticles having said preselected morphology and a metal oxide nanosheet comprising conjoined nanoparticles having said preselected morphology.

2. A method in accordance with claim 1 wherein said polymeric nanostructures comprise 0.001% to less than 1% of said suspension and wherein said metal oxide comprises metal oxide nanoparticles having said preselected morphology.

3. A method in accordance with claim 1 wherein said polymeric nanostructures comprise at least 1% of said suspension and wherein said metal oxide comprises a metal oxide nanosheet comprising conjoined nanoparticles having said preselected morphology.

4. A method in accordance with claim 1 wherein said polymeric nanostructures comprise 0.01 to 0.5 weight % of said suspension.

5. A method in accordance with claim 1 wherein said polymeric nanostructures comprise 0.05 to 0.25 weight % of said suspension.

6. A method in accordance with claim 1 wherein said polymeric nanostructures comprise at least one of the group consisting of cellulose nanofibrils and cellulose nanocrystals.

7. A method in accordance with claim 1 wherein said metal oxide precursor comprises at least one metal oxide precursor selected from the group consisting of: an indium-tin-oxide precursor, a zinc oxide precursor, a titanium dioxide precursor, and an iron oxide precursor.

8. A method in accordance with claim 7 wherein said indium-tin-oxide precursor comprises a mixture of indium trichloride and tin (II) chloride.

9. A method in accordance with claim 1 wherein said preselected ratio is in the range of 1:3 to 1:7 and wherein said preselected morphology comprises predominantly nanowires.

10. A method in accordance with claim 1 wherein said preselected ratio is in the range of 1:17 to 1:23 and wherein said preselected morphology comprises predominantly nanorods.

11. A method in accordance with claim 1 wherein said preselected ratio is in the range of 1:27 to 1:33 and wherein said preselected morphology comprises predominantly nanospheres.

12. A method in accordance with claim 1 wherein said preselected ratio is at least 1:70 and wherein said preselected morphology comprises predominantly nanocrystals.

13. A method in accordance with claim 1 wherein said nanocrystals are predominantly octahedral.

\* \* \* \* \*